(12) United States Patent
Thordarson et al.

(10) Patent No.: US 6,467,505 B1
(45) Date of Patent: Oct. 22, 2002

(54) VARIABLE PRESSURE REGULATED FLOW CONTROLLERS

(75) Inventors: Petur Thordarson; Patrick A. Lowery, both of Carlsbad, CA (US)

(73) Assignee: Flowmatrix Inc., Carlsbad, CA (US)

( * ) Notice: Subject to any disclaimer, the term of this patent is extended or adjusted under 35 U.S.C. 154(b) by 0 days.

(21) Appl. No.: 09/805,708

(22) Filed: Mar. 13, 2001

Related U.S. Application Data
(60) Provisional application No. 60/239,716, filed on Oct. 11, 2000.

(51) Int. Cl.[7] .................................................. G05D 7/00
(52) U.S. Cl. ........................................ 137/613; 137/606
(58) Field of Search ................................. 137/613, 606

(56) References Cited

U.S. PATENT DOCUMENTS

| | | | |
|---|---|---|---|
| 3,100,504 A | * | 8/1963 | Kauer, Jr. ................ 137/613 X |
| 4,015,626 A | | 4/1977 | Thordarson |
| 4,096,746 A | | 6/1978 | Wilson et al. |
| 4,210,171 A | | 7/1980 | Rikuta |
| 4,629,561 A | | 12/1986 | Shirato et al. |
| 5,137,046 A | * | 8/1992 | Sollman ................... 137/117 |
| 5,329,966 A | | 7/1994 | Fenimore et al. |
| 5,762,086 A | | 6/1998 | Olivier |
| 6,026,849 A | | 2/2000 | Thordarson |

FOREIGN PATENT DOCUMENTS

| WO | WO 00/11530 | 2/2000 |
|---|---|---|

* cited by examiner

Primary Examiner—Kevin Lee
(74) Attorney, Agent, or Firm—Price and Gess

(57) ABSTRACT

A flow controller having a first and second stages of regulation. The first stage is a pressure regulation stage that maintains the pressure within an intermediate chamber (formed by a series of interconnected passageways and cavities) within a predetermined range above the pressure in an outlet port. The second stage maintains the flow rate within a predetermined range about a target flow rate. Both stages sample the pressure in the outlet port and automatically adjust the flow of fluid to ensure that fluctuations in pressure at the inlet and outlet ports do not affect the flow rate. The flow rate is set and controlled by a user determined setpoint. The pressure is regulated by one or more feedback systems. The feedback systems used may be mechanical or electromechanical based on a particular operating environment.

20 Claims, 11 Drawing Sheets

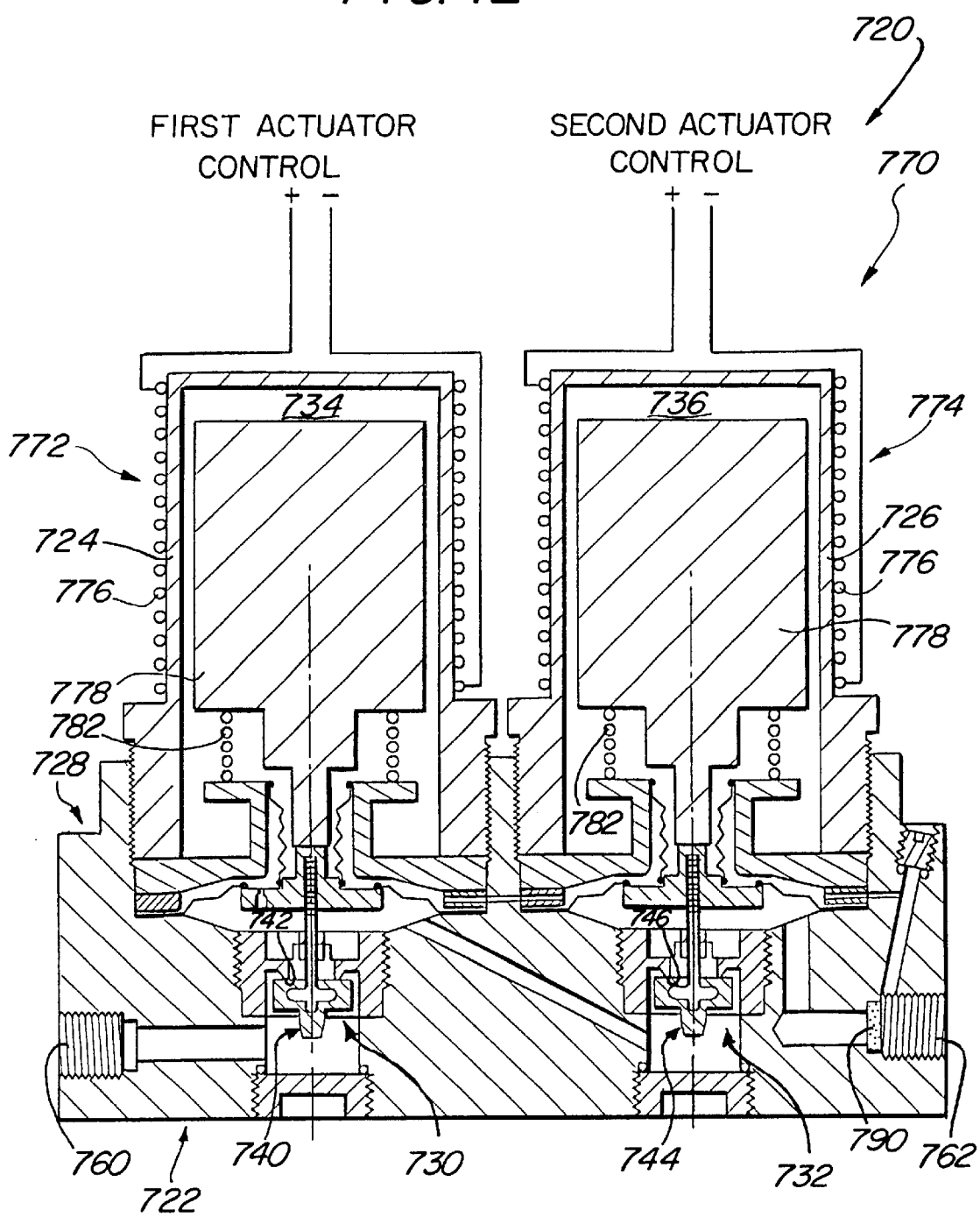

VARIABLE PRESSURE REGULATED FLOW CONTROLLERS

RELATED APPLICATIONS

This application claims priority of U.S. Provisional Application Serial No. 60/239,716 filed Oct. 11, 2000.

TECHNICAL FIELD

The present invention relates to systems and methods for controlling the flow of pressurized fluid and, more specifically, to such systems and methods that allow precise control of flow of fluid from a source having high, variable, and/or unknown pressure.

BACKGROUND OF THE INVENTION

In many disciplines, a pressurized fluid must be supplied in precise quantities. Usually, the quantity of fluid supplied is controlled by regulating the flow of the fluid. Fluid flow is independent of conduit size, supply pressure, and the like, and controlling the flow rate ensures that a precise quantity of the fluid is delivered where required.

The present invention is of particular significance when used to control the flow of gasses at relatively low flow rates. The present invention also has application to other fluids such as liquids and to relatively large flow rates. The scope of the present invention should thus be determined with reference to the claims appended hereto and not the following detailed description.

One example where the quantity of a gas supplied must be precisely controlled is the delivery of a gas to a medical patient. In this context, a gas is mixed with air supplied to the patient through a ventilator to obtain a desired effect. If too little gas is supplied to the patient, the desired effect may not be obtained. On the other hand, too much gas may be toxic to the patient. Other examples where precise quantities of gas must be supplied include scientific and medical testing, industrial processing, and scuba diving.

A primary impediment to maintaining a constant flow of gas is that the pressure at which the gas is supplied may be unknown or variable. Often, the source of the pressurized gas is a pressurized tank or compressor. The pressure of the fluid supplied by either of these sources can fluctuate significantly. For example, as the quantity of gas within a pressurized tank decreases, the pressure of the fluid flowing from the tank will decrease. Accordingly, in many systems in which the flow of a gas is important, the flow rate must be measured and monitored and the system adjusted as necessary to maintain the flow rate within predetermined limits.

RELATED ART

U.S. Pat. No. 4,015,626 issued to the present Applicant discloses a valve assembly for maintaining constant flow rates. This valve assembly comprises a housing that defines upstream and downstream chambers, a movable wall assembly arranged between these chambers, a spring located in the downstream chamber that acts on the movable wall, a bicycle valve located in the upstream chamber such that its control stem engages the movable wall, and coiled high resistance tubing connected between the chambers. Changes in the pressure in the downstream chamber allow the movable wall to move and operate the bicycle valve control stem to open or close the bicycle valve to control the flow of fluid flowing through the valve assembly. The spring may be adjusted to obtain different flow rates. The tubing functions as a pressure reducing restriction and to average the flow rate of fluid passing therethrough.

The valve assembly disclosed in the '626 patent is relatively complex and expensive to manufacture. Also, the pressure drop through the high resistance tubing plays an important role in determining the range of flow rates that may be obtained. Altering the pressure drop through the tubing to obtain different flow rate ranges would be difficult because different tubing (i.e., change of length or passageway size) must be used. The length of the high resistance tubing supplied renders the system relatively large and increases the likelihood of failure. And this valve assembly is designed to operate only at relatively low (80 to 150) psi.

U.S. Pat. No. 6,026,849 issued on Feb. 22, 2000, to the present Applicant also discloses a regulated flow controller that operates using a source having high, variable, and/or unknown pressure. The systems and methods disclosed in the '849 patent solved many problems related to supplying fluids, and in particular gasses, at constant flow rate.

However, the need exists for improvements to regulated flow controllers such as are disclosed in the '849 patent that allow this technology to be applied to specific environments.

BRIEF DESCRIPTION OF THE DRAWINGS

FIG. 12 is a section view of a sixth embodiment of a flow controller constructed in accordance with, and embodying, the principles of the present invention.

DETAILED DESCRIPTION OF THE PREFERRED EMBODIMENTS

I. First Embodiment

Figure 1:
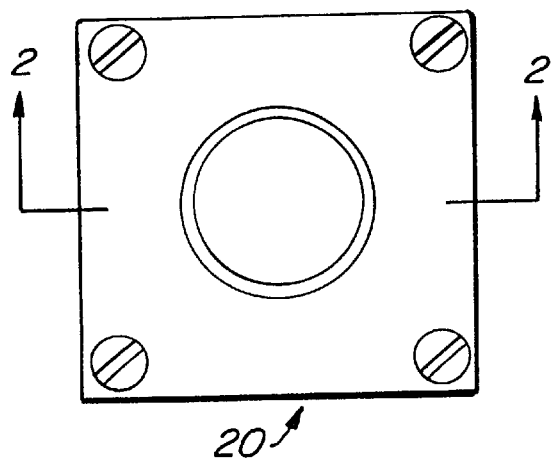
FIG. 1 is an end elevation view of a first embodiment of a flow controller constructed in accordance with, and embodying, the principles of the present invention.

Referring now to FIG. 1 of the drawing, depicted therein at 20 is a flow controller system constructed in accordance with, and embodying, the principles of the present invention. The flow controller system 20 of the first embodiment may be manufactured relatively inexpensively and is designed to operate reliably in a variety of configurations depending upon such factors as the expected range of input pressure and the desired range of flow rates.

The exemplary flow controller system 20 comprises a housing assembly 22 comprising a first end member 24, a second end member 26, an intermediate member 28, and first and second diaphragm members 30 and 32. The first and second end members 24 and 26 are attached to the intermediate members 28 using bolts 34 to form the housing assembly 22. So assembled, the first diaphragm member 30 is arranged between the first upper member 24 and the intermediate member 28 to define an input chamber 40 and a first regulator chamber 42. The second diaphragm member 32 is arranged between the second upper member 26 and the intermediate member 28 to define an output chamber 44 and a second regulator chamber 46.

Figure 4:
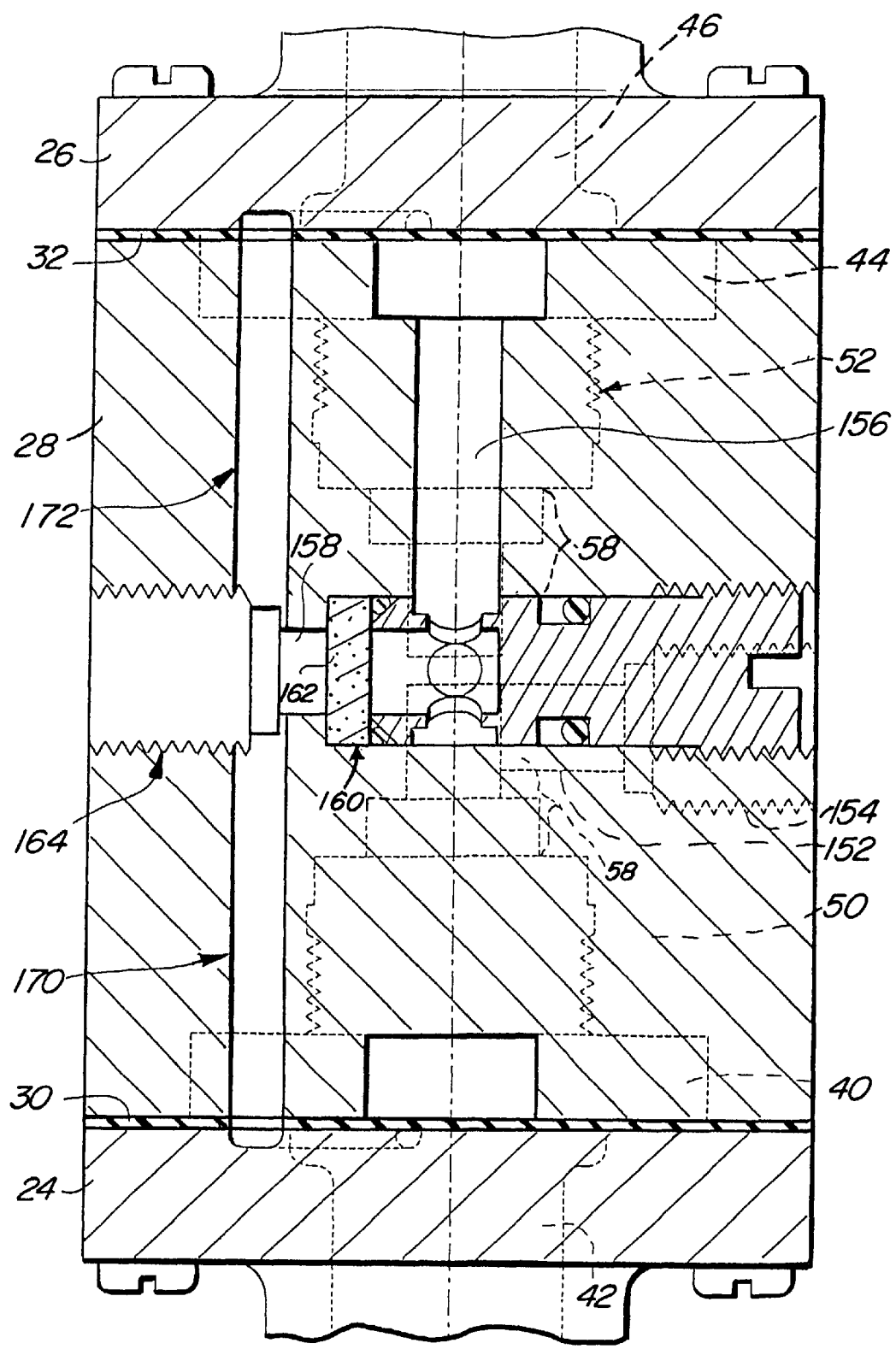
FIG. 4 is a section view of the flow controller of the first embodiment taken along lines 4—4 in FIG. 2.

Referring now to FIG. 4, it can be seen that the exemplary intermediate member 28 is milled to define first and second end cavities 50 and 52. The exemplary first and second end cavities 50 and 52 are similar and each comprises an outer portion 54, a threaded intermediate portion 56, and an inner portion 58.

First and second valve assemblies 60 and 62 are arranged substantially within the first and second end cavities 50 and 52, respectively. Except for dimensional differences, the exemplary valve assemblies 60 and 62 are similar in construction.

In particular, the first valve assembly 60 comprises a first valve seat member 70, a first O-ring 72, a first valve stem assembly 74, and a first valve spring 76. The second valve assembly 62 comprises a second first valve seat member 80, a second O-ring 82, a second valve stem assembly 84, and a second valve spring 86.

The first and second valve seat members 70 and 80 are threaded into the threaded portions 56 of the first and second end cavities 50 and 52, respectively. The O-rings 72 and 82 are retained within the threaded portions 56 of the end cavities 50 and 52 by the valve seat members 70 and 80. The first O-ring 72 is thus arranged in the threaded portion 56 of the first end cavity 50 to prevent fluid flow between the threaded and inner portions 56 and 58 of the cavity 50. The second O-ring 82 is similarly arranged in the threaded portion 56 of the second end cavity 52 to prevent fluid flow between the threaded and inner portions 56 and 58 of that cavity 52.

The exemplary valve stem assemblies 74 and 84 are identical and each comprises a stem member 90 and a valve member 92. The exemplary stem member 90 is a T-shaped part the cross-bars of which are embedded within the valve member 92.

The stem members 90 of the valve stem assemblies 74 and 84 extend through and are supported by first and second stem openings 110 and 112 formed in the valve seat members 70 and 80, respectively. In addition, the valve members 92 of the valve stem assemblies 74 and 84 are arranged adjacent to valve seat surfaces 114 and 116 formed on the valve seat members 70 and 80.

The valve stem assemblies 74 and 84 move a short distance relative to the valve seat members 70 and 80 such that the valve members 96 engage or disengage from the valve seat surfaces 114 and 116. When the valve members 96 are disengaged from the valve seat surfaces 114 and 116, fluid is allowed to flow through first and second valve passageways 120 and 122 formed in the valve seat members 70 and 80, respectively. But when the valve members 96 engage the valve seat surfaces 114 and 116, fluid flow through the first and second valve passageways 120 and 122 is prevented.

The first and second valve springs 76 and 86 are arranged in the inner portions 58 of the first and second end cavities 50 and 52, respectively, to bias the valve members 92 of the valve stem assemblies 74 and 84 towards the valve seat surfaces 114 and 116.

The valve assemblies 60 and 62 are thus normally closed valves. Further, the valve assemblies 60 and 62 open substantially linearly in response to first and second valve control forces applied to upper members 124 and 126 of the valve stem assemblies 74 and 84.

The upper members 124 and 126 of the valve stem assemblies 74 and 84 are located in the input chambers 40 and 44. First and second valve plates 130 and 132 are located in the input chambers 40 and 44 between the valve stem upper members 124 and 126 and the first and second diaphragm members 30 and 32, respectively. First and second piston members 140 and 142 are located in the first and second regulator chambers 42 and 46 on the other side of the first and second diaphragm members 30 and 32 from the first and second valve plates 130 and 132. First and second regulator springs 144 and 146 are also located in the regulator chambers 42 and 46 to bias the first and second piston members 140 and 142 towards the valve plates 130 and 132 through the diaphragm members 30 and 32. The diaphragm members 30 and 32 are flexible and thus allow forces on the piston members 140 and 142 to be transferred to the valve plates 130 and 132.

Figure 3:
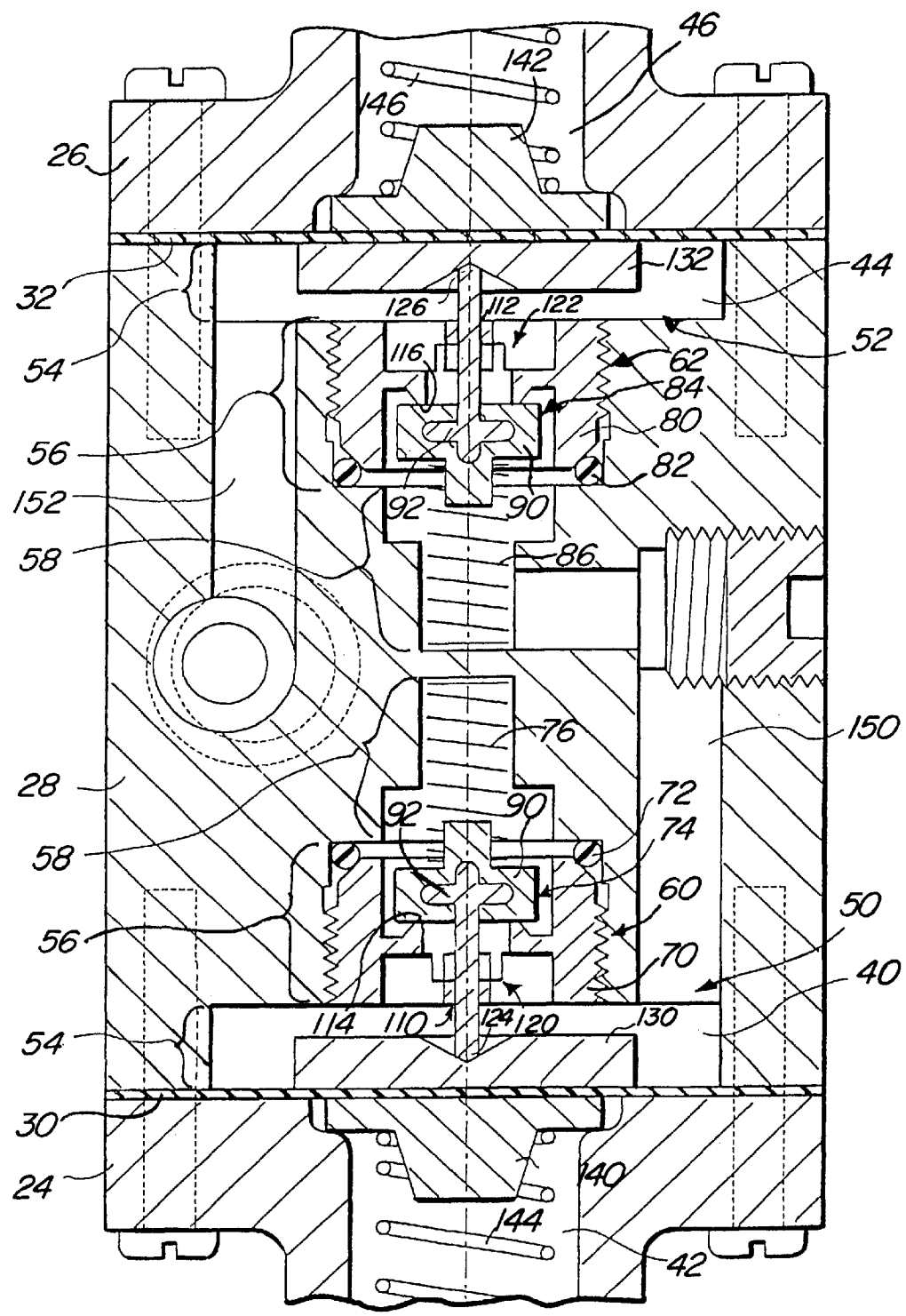
FIG. 3 is an enlarged section view showing details of the flow controller of the first embodiment as depicted in FIG. 2.

Referring now back to the construction of the housing assembly 22, FIG. 3 shows that a connecting passageway 150 extends between the inlet chamber 40 and the inner portion 58 of the second end cavity 52. Fluid thus may flow from the inlet chamber 40 to the outlet chamber 42 through the second valve assembly 62 when the second valve assembly 62 is open.

FIG. 4 shows in broken lines an inlet passageway 152 that extends from an inlet port 154 to the inner portion 58 of the first end cavity 50. Fluid may thus flow from the inlet port 154 to the inlet chamber 42 through the first valve assembly 60 when the first valve assembly 60 is open.

FIGS. 3 and 4 show a restriction passageway 156 that allows fluid to flow from the outlet chamber 42 to an outlet passageway 158 through a restriction chamber 160. A restriction member 162 is located in the restriction chamber 160. The outlet passageway 158 in turn allows fluid to flow from the restriction passageway 156 through the restriction member 162 to an outlet port 164.

FIG. 4 also shows that first and second sampling passageways 170 and 172 allow fluid to flow from the outlet passageway 158 to the first and second regulator chambers 42 and 46, respectively.

FIG. 4 further shows that the restriction chamber 160 is formed by an access hole 180 milled into the intermediate member 28. The access hole 180 is threaded to allow an elongate plug 182 to be attached to the intermediate member 28. The plug 182 defines a plug chamber 184 through which fluid flows from the restriction passageway 156 to the restriction chamber 160. A first plug O-ring 186 is arranged to ensure that fluid flows from the restriction passageway 156 only through the restriction member 162 in the restriction chamber 160. A second O-ring 188 is arranged to prevent fluid from exiting the system 20 through the access hole 180.

In use, fluid flows from the inlet port 154 to the outlet port 164 along a main fluid path as follows: fluid in the inlet port 154 flows into the inlet chamber 40 through the inlet passageway 152; fluid then flows from the inlet chamber 40 to the outlet chamber 44 through the first valve assembly 60, the connecting passageway 150, and the second valve assembly 62; fluid in the outlet chamber 44 then flows to the outlet port 164 through the restriction passageway 156, the restriction member 162 in the restriction chamber 160, and the outlet passageway 158.

Fluid in the outlet passageway 158 flows to the first and second regulator chambers 42 and 46 through the sampling passageways 170 and 172. The combination of the fluid pressure in the regulator chambers 42 and 46 and biasing force applied by the regulator springs 144 and 146 creates control forces that control the valve assemblies to maintain substantially a substantially constant fluid flow rate through the flow controller 20 that is substantially independent of upstream or downstream pressure changes.

Figure 2:
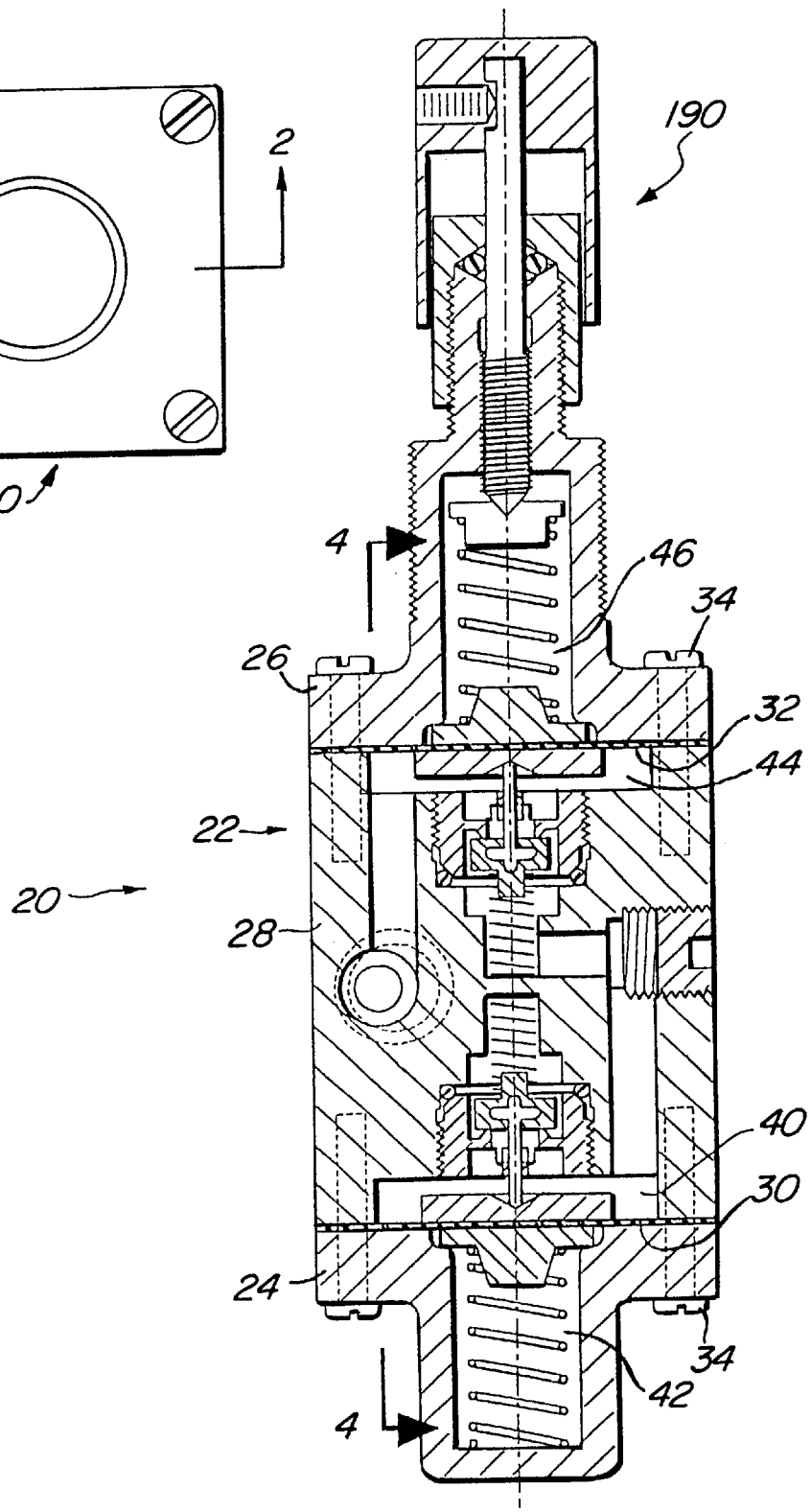
FIG. 2 is a section view of the flow controller of the first embodiment taken along lines 2—2 in FIG. 1.

Referring for a moment back to FIG. 2, depicted at 190 therein is a pressure adjusting assembly that adjusts the control force applied by the second regulator spring 146 to the upper member 126 of the second valve stem assembly 84. The pressure adjusting assembly 190 allows the flow rate of fluid through the system 20 to be adjusted. While the exemplary pressure adjusting assembly 190 is manually operated, a powered pressure adjusting assembly could be used, as will be discussed below, that would allow the flow rate to be controlled remotely and/or automatically.

The design of the housing assembly 22 allows the flow controller system 20 easily to be configured for different environments. In particular, the intermediate member 28, which is a relatively complicated part, can be manufactured in a standard form. The standard intermediate member 28 can then be configured for a specific environment by appropriate selection of the first and second valve seat members 70 and 72 and the restriction member 162.

The valve seat members may be manufactured in different forms, each having a valve passageways with a different effective cross-sectional area. The effective cross-sectional area of the valve passageway for a given first or second valve seat member is selected based on the expected range of upstream and downstream fluid pressures. A system designer will select the appropriate valve seat member for a given environment. If two different valve seat members are fabricated each defining a different cross-sectional area, the system designer may select from among four effective configurations of the flow controller system. More valve seat members will provide more effective configurations of the flow controller system.

The restriction member 162 creates a predetermined pressure drop between the restriction passageway 156 and the outlet passageway 158. The magnitude of this pressure drop may be altered by selecting different restriction members and/or using two or more restriction members in various combinations. The characteristics of the flow controller system of the present invention may thus be altered by appropriate selection of the restriction member 162.

The flow controller system 20 thus forms a general purpose flow controller that may easily be embodied in different configurations depending upon the environment in which the system 20 is to be used.

II. Second Embodiment

Figure 5:
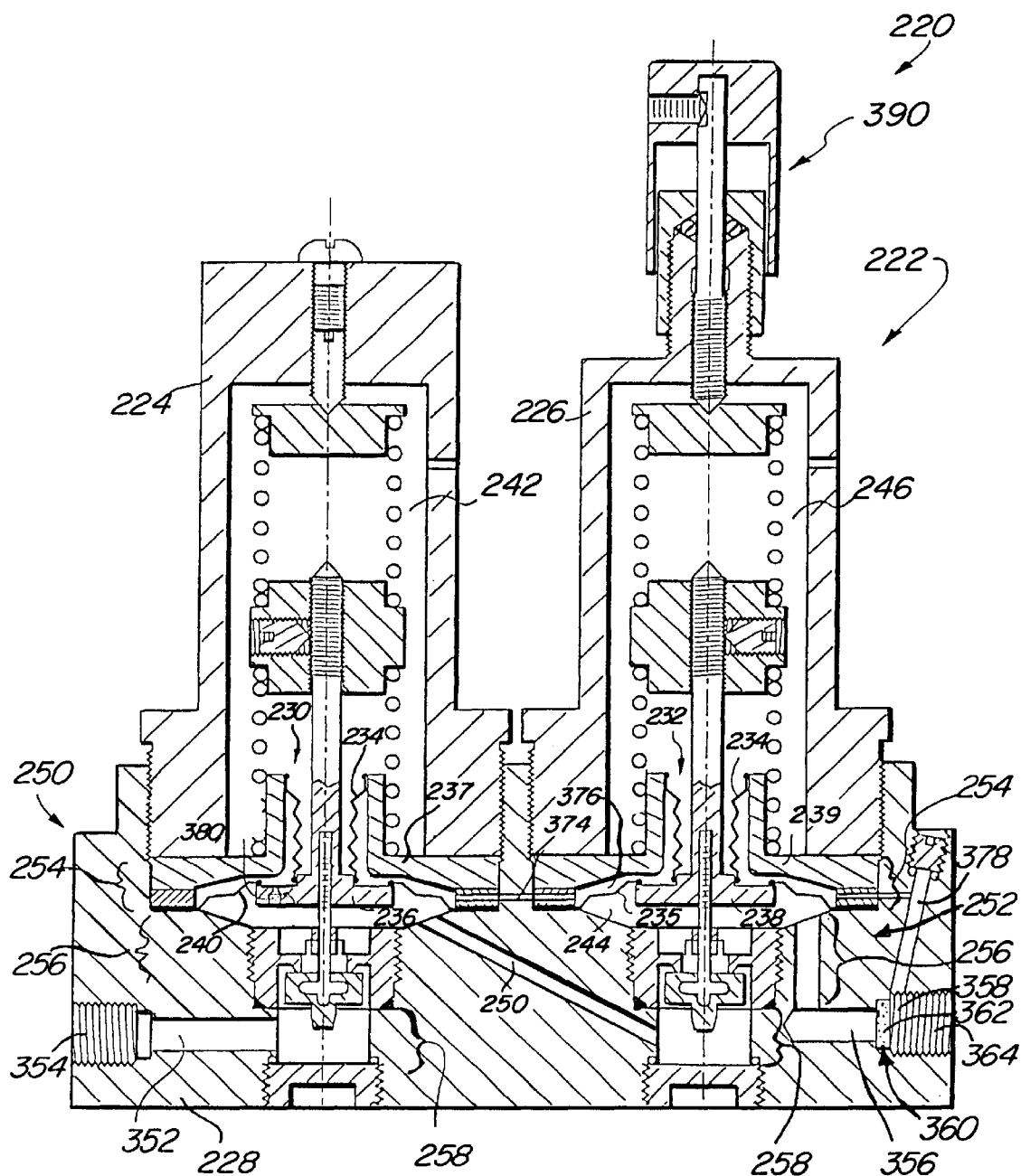
FIG. 5 is a section view of a second embodiment of a flow controller constructed in accordance with, and embodying, the principles of the present invention.
Figure 6A:
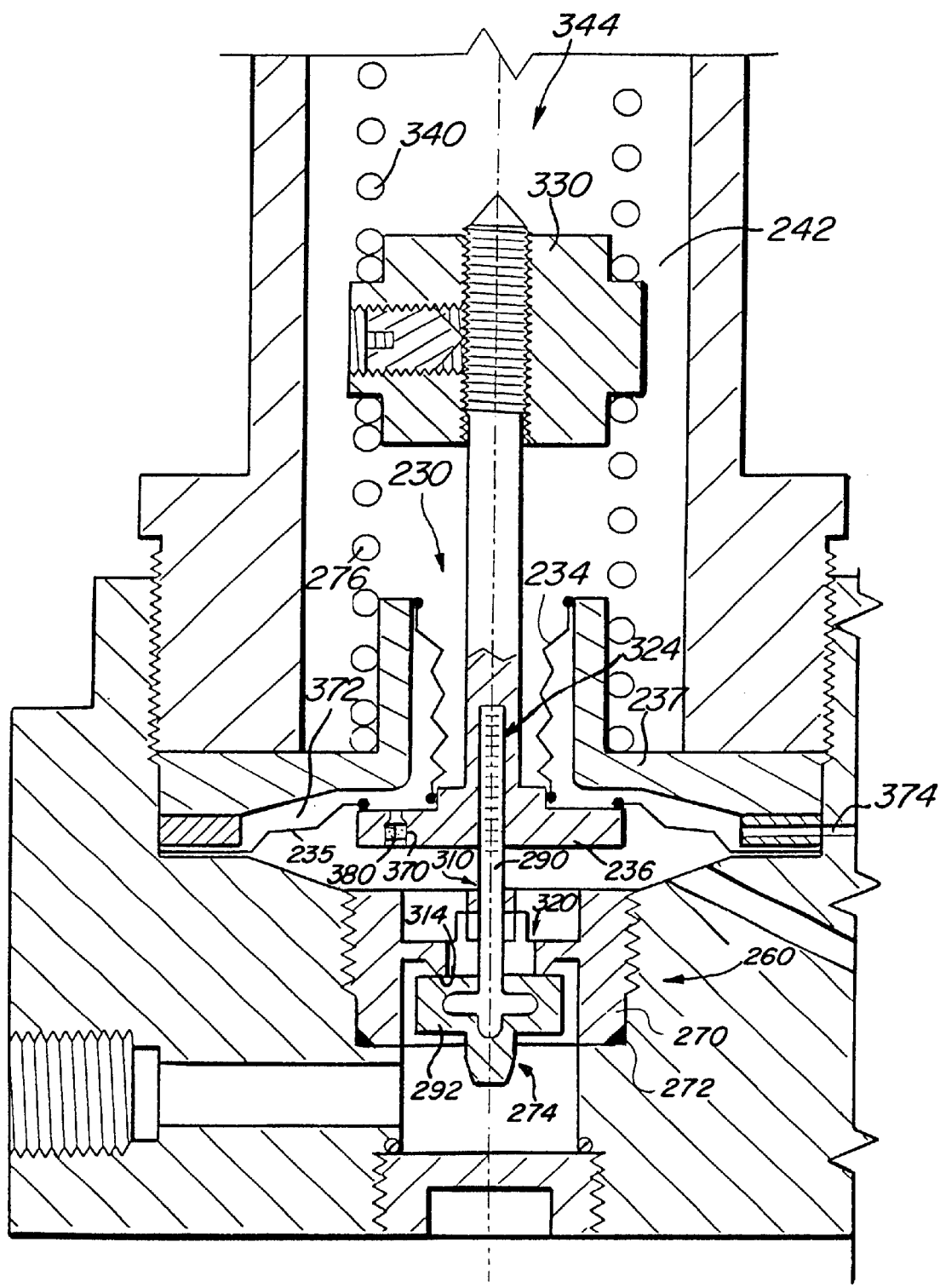
FIG. 6A is a section view depicting details of an input stage of the second embodiment of the flow controller as depicted in FIG. 5.
Figure 6B:
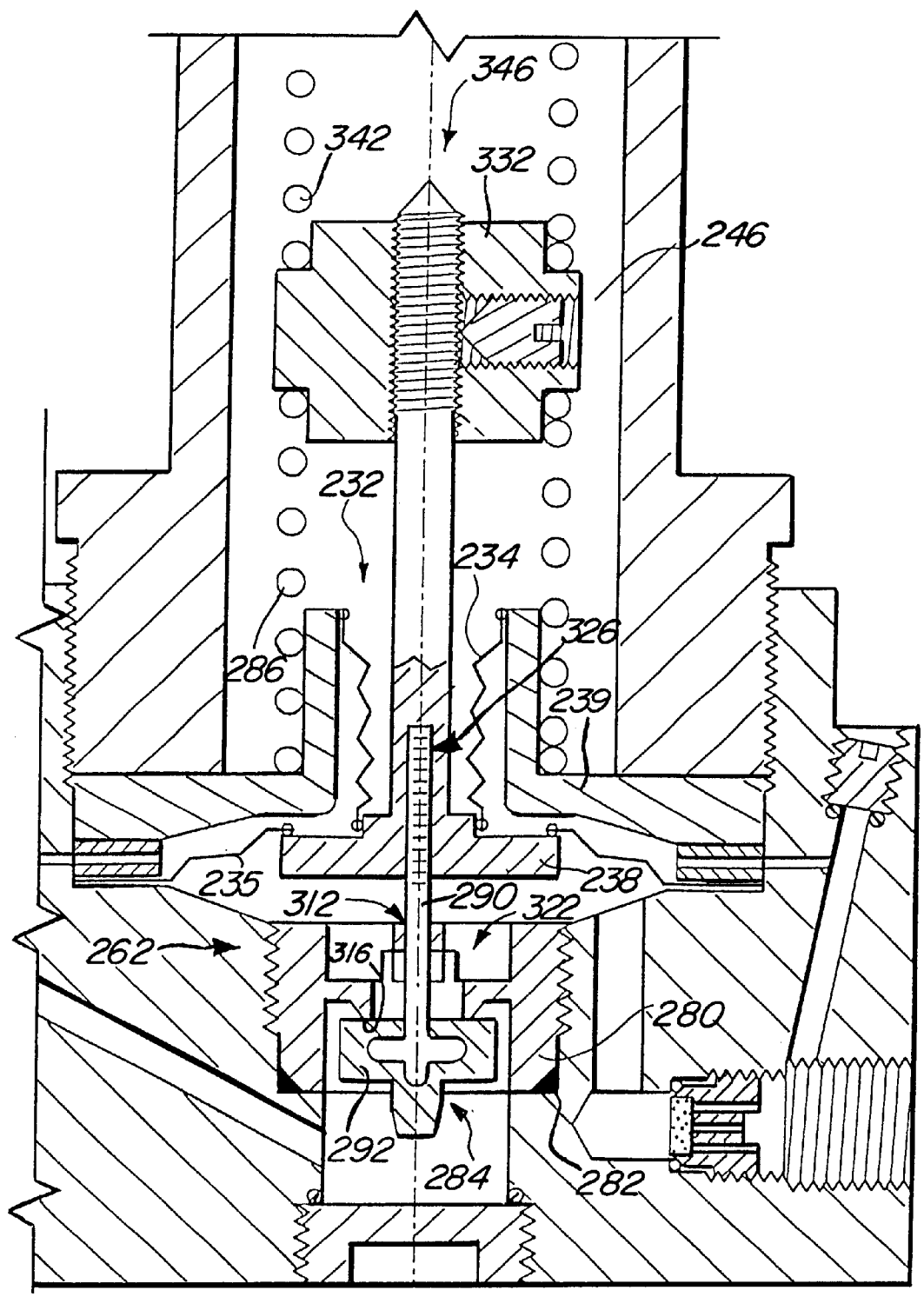
FIG. 6B is a section view depicting details of an output stage of the second embodiment of the flow controller as depicted in FIG. 5.

Referring now to FIG. 5 of the drawing, depicted therein at 220 is a second embodiment of a flow controller system constructed in accordance with, and embodying, the principles of the present invention. The flow controller system 220 of the second embodiment is designed to operate reliably in a variety of configurations depending upon such factors as the expected range of input pressure and the desired range of flow rates. While the flow controller system 220 may have application in many environments, it is of particular significance in clean environments in which the risk of contamination of the fluid must be minimized.

The exemplary flow controller system 220 comprises a housing assembly 222 comprising a first upper member 224, a second upper member 226, a base or intermediate member 228, and first and second diaphragm assemblies 230 and 232.

The diaphragm assemblies 230 and 232 are similar to each other and each comprise first and second diaphragm members 234 and 235. The first diaphragm assembly 230 further comprises a first diaphragm plate 236 and a first diaphragm sleeve 237; the second diaphragm assembly 232 also further comprises a second diaphragm plate 238 and a second diaphragm sleeve 239.

The diaphragm members 234 and 235 are welded to the diaphragm plates 238 and 239. The diaphragm members 234 are additionally welded to the diaphragm sleeves 237 and 239, while the diaphragm members 235 are secured between the diaphragm sleeves 237 and 239 and the intermediate member 224. The first and second upper members 224 and 226 are threaded onto the base member 228 to form the housing assembly 222.

So assembled, the first diaphragm assembly 230 defines an input chamber 240 and a first regulator chamber 242. The second diaphragm assembly 232 defines an output chamber 244 and a second regulator chamber 246. Welds and seals are employed to ensure that flow between the various chambers described herein are only through the passageways or flow paths defined below.

The exemplary base member 228 is milled to define first and second end cavities 250 and 252. The exemplary first and second cavities 250 and 252 are similar and each comprises a threaded outer portion 254, a threaded intermediate portion 256, and an inner portion 258.

First and second valve assemblies 260 and 262 are arranged substantially within the first and second end cavities 250 and 252, respectively. Except for dimensional differences that will be noted below, the exemplary valve assemblies 260 and 262 are similar in construction.

In particular, the first valve assembly 260 comprises a first valve seat member 270, a first O-ring 272, a first valve stem assembly 274, and a first valve spring 276. The second valve assembly 262 comprises a second first valve seat member 280, a second O-ring 282, a second valve stem assembly 284, and a second valve spring 286.

The first and second valve seat members 270 and 280 are threaded into the threaded portions 256 of the first and second end cavities 250 and 252, respectively. The O-rings 272 and 282 are retained within the threaded portions 56 of the end cavities 50 and 52 by the valve seat members 70 and 80. The first O-ring 72 is thus arranged in the threaded portion 256 of the first end cavity 250 to prevent fluid flow between the threaded and inner portions 256 and 258 of the cavity 250. The second O-ring 282 is similarly arranged in the threaded portion 256 of the second end cavity 252 to prevent fluid flow between the threaded and inner portions 256 and 258 of that cavity 252.

The exemplary valve stem assemblies 274 and 284 are identical and each comprises a stem member 290 and a valve member 292. The exemplary stem member 290 is a T-shaped part the cross-bars of which are embedded within the valve member 292.

The stem members 290 of the valve stem assemblies 274 and 284 extend through and are supported by first and second stem openings 310 and 312 formed in the valve seat members 370 and 380, respectively. In addition, the valve members 292 of the valve stem assemblies 274 and 284 are arranged adjacent to valve seat surfaces 314 and 316 formed on the valve seat members 270 and 280.

The valve stem assemblies 274 and 284 move a short distance relative to the valve seat members 270 and 280 such that the valve members 296 engage or disengage from the valve seat surfaces 314 and 316. When the valve members 296 are disengaged from the valve seat surfaces 314 and 316, fluid is allowed to flow through first and second valve passageways 320 and 322 formed in the valve seat members 270 and 280, respectively. But when the valve members 296 engage the valve seat surfaces 314 and 316, fluid flow through the first and second valve passageways 320 and 322 is prevented.

The first and second valve springs 276 and 286 are arranged in the first and second regulator chambers 242 and 246, respectively. As will be described in detail below, the valve springs 276 and 286 bias the valve members 292 of the valve stem assemblies 274 and 284 towards the valve seat surfaces 314 and 316.

The valve assemblies 260 and 262 are thus normally closed valves. Further, the valve assemblies 260 and 262 open substantially linearly in response to first and second valve control forces applied to upper portions 324 and 326 of the valve stem assemblies 274 and 284.

The upper portions 324 and 326 of the valve stem assemblies 274 and 284 are located in the input chambers 240 and 244 and are rigidly connected to the diaphragm plates 236 and 238, respectively. The diaphragm plates 236 and 238 are in turn connected to first and second regulator plates 330 and 332 located in the first and second regulator chambers 242 and 246.

First and second regulator springs 340 and 342 are also located in the regulator chambers 242 and 246 to bias the first and second regulator plates 340 and 342 towards the diaphragm plates 236 and 238 through the valve springs 276 and 286.

The first regulator plate 330, first diaphragm plate 238, and first valve member 274 thus are rigidly connected to each other to form a first slide assembly 344. Similarly, the second regulator plate 332, second diaphragm plate 239, and second valve member 284 are rigidly connected to each other to form a second slide assembly 346.

The slide assemblies 344 and 346 are suspended by the first and second stem openings 310 and 312 formed in the valve seat members 370 and 380, the diaphragm members 234 and 236, the valve springs 276 and 286, and the first and second regulator springs 340 and 342. The diaphragm members 234 and 236 and springs 276, 286, 340, and 342 are flexible and allow the slide assemblies 344 and 346 to move. In addition, the valve members 274 and 284 slide relative to the valve set members 370 and 380. Accordingly, the slide assemblies 344 and 346 move within the housing assembly 222 such that forces on the diaphragm members 234 and 236 open and close the valve assemblies 260 and 262.

Referring now back to FIG. 5, a connecting passageway 350 extends between the inlet chamber 240 and the inner portion 258 of the second end cavity 252. Fluid thus may flow from the inlet chamber 240 to the outlet chamber 242 through the second valve assembly 262 when the second valve assembly 262 is open.

An inlet passageway 352 extends from an inlet port 354 to the inner portion 258 of the first end cavity 250. Fluid may thus flow from the inlet port 354 to the inlet chamber 240 through the first valve assembly 262 when the first valve assembly 262 is open.

A restriction passageway 356 allows fluid to flow from the outlet chamber 242 to an outlet passageway 358 through a restriction chamber 360. A restriction member 362 is located in the restriction chamber 360. The outlet passageway 358 in turn allows fluid to flow from the restriction passageway 356 through the restriction member 362 to an outlet port 364.

A first bypass passageway 370 formed in the diaphragm plate 238 allows fluid to flow from the inlet chamber 240 to a first bypass chamber 372 defined by the first diaphragm assembly 230 and the housing assembly 222. A second bypass passageway 374 formed in the base member 224 allows fluid to flow from the first bypass chamber 372 to a second bypass chamber 246 defined by the second diaphragm assembly 232 and the housing assembly 222. A sampling passageway 378 connects the outlet passageway 358 to the second bypass chamber 374. A bypass member 380 is located within the first bypass passageway 370 to create a pressure differential between the inlet chamber 240 and the first bypass chamber 372.

In use, fluid is introduced into the inlet port 354 and then flows through the system 220 along a main flow path as follows. Fluid in the inlet port 354 flows into the inlet chamber 240 through the inlet passageway 252. Fluid then flows from the inlet chamber 240 to the outlet chamber 242 through the first valve assembly 260, the connecting passageway 250, and the second valve assembly 262. Fluid in the outlet chamber 242 then flows to the outlet port 364 through the restriction passageway 356, the restriction member 362 in the restriction chamber 360, and the outlet passageway 358.

A small amount of fluid in the inlet chamber 240 flows along a bypass path through the bypass member 278 in the first bypass passageway 370 and into the first bypass chamber 372. This fluid continues along the bypass path through the second bypass passageway 374 and into the second bypass chamber 376. The fluid then further continues along the bypass path from the second bypass chamber 376 to the outlet passageway 358 through the sampling passageway 378.

The pressure within the first and second bypass chambers 372 and 376 is thus the same as the pressure within the outlet passageway 358. The combination of the fluid pressure in the bypass chambers 372 and 376 and biasing force applied by the regulator springs 344 and 346 creates control forces that control the valve assemblies 260 and 262 to maintain substantially a substantially constant fluid flow rate through the flow controller 20 that is substantially independent of upstream or downstream pressure changes. However, fluid does not accumulate in the bypass chambers or bypass passageways because a small amount of the fluid will flow along the bypass path during normal operation of the system 220.

Referring for a moment back to FIG. 5, depicted at 390 therein is a pressure adjusting assembly that adjusts the control force applied by the second regulator spring 346 to the second valve stem assembly 284. The pressure adjusting assembly 390 allows the flow rate of fluid through the system 220 to be adjusted. While the exemplary pressure adjusting assembly 390 is manually operated, a powered pressure adjusting assembly could be used that would allow the flow rate to be controlled remotely and/or automatically.

The design of the housing assembly 222 allows the flow controller system 220 appropriate for use in situations in which contact between the springs and the controlled fluid is avoided and fluid is not allowed to collect anywhere within the system 220.

As with the system 20 described above, the valve seat members may be manufactured in different forms, each having a valve passageways with a different effective cross-sectional area. The effective cross-sectional area of the valve passageway for a given first or second valve seat member is selected based on the expected range of upstream and downstream fluid pressures. A system designer will select the appropriate valve seat member for a given environment. If two different valve seat members are fabricated each defining a different cross-sectional area, the system designer may select from among four effective configurations of the flow controller system. More valve seat members will provide more effective configurations of the flow controller system. In addition, the valve seat members of the system 20 may be the same as, and used in, the system 220.

The restriction member 362 creates a predetermined pressure drop between the restriction passageway 356 and the outlet passageway 358. The magnitude of this pressure drop may be altered by selecting different restriction members and/or using two or more restriction members in various combinations. The characteristics of the flow controller system of the present invention may thus be altered by appropriate selection of the restriction member 362.

III. Third Embodiment

Figure 7:
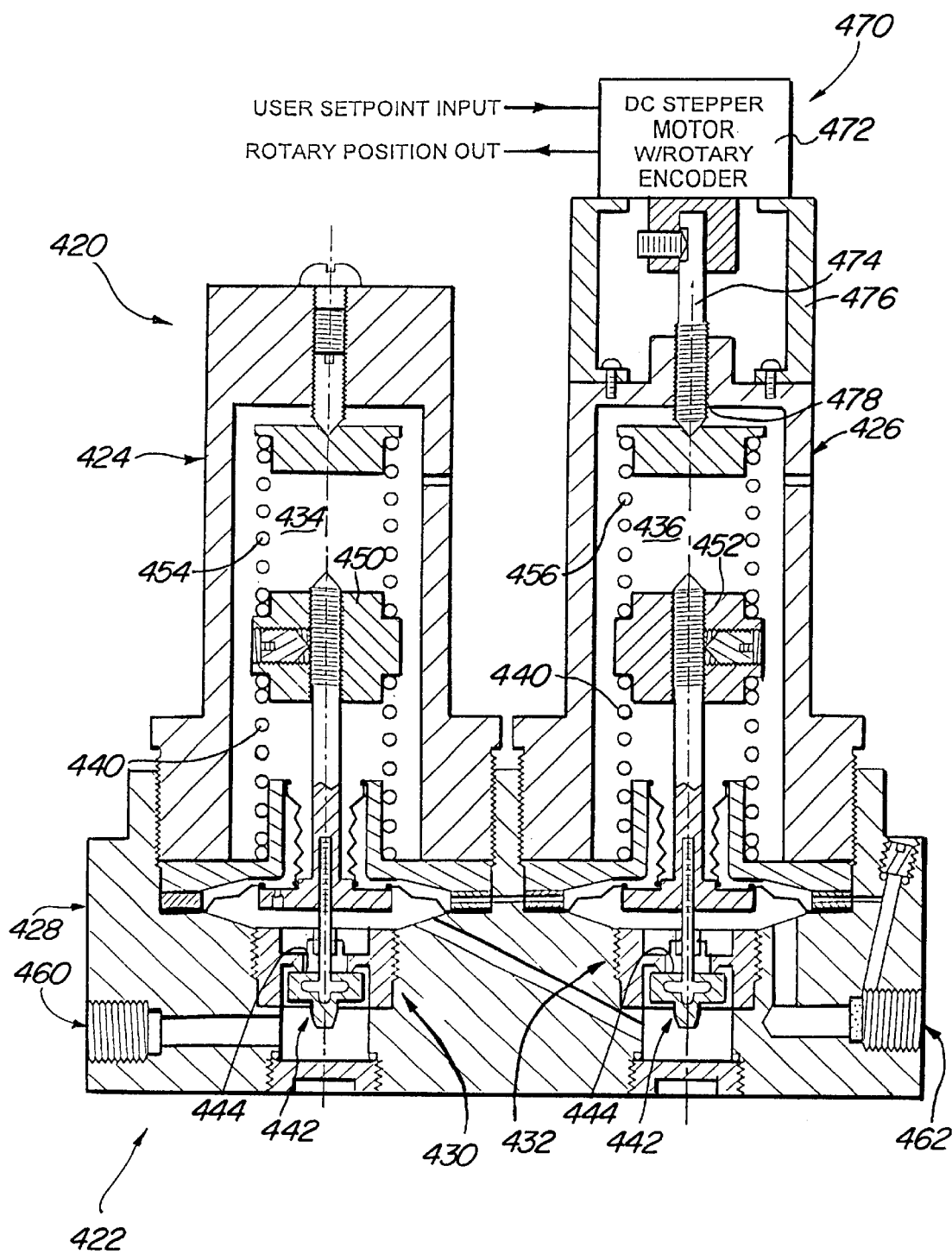
FIG. 7 is a section view of a third embodiment of a flow controller constructed in accordance with, and embodying, the principles of the present invention.

Referring now to FIG. 7, depicted at 420 therein is yet another exemplary flow controller system constructed in accordance with, and embodying, the principles of the present invention. The flow controller system 420 of the third embodiment is similar to the flow controller system 220 described above. In the interests of brevity and clarity, the flow controller system 420 will be described primarily to the extent that it differs from the flow controller system 220.

The flow controller system 420 is designed to be electrically controlled so that the system 420 may be operated remotely and/or as part of a larger system having a centralized controller.

The exemplary flow controller system 420 comprises a housing assembly 422 comprising a first upper member 424, a second upper member 426, a base or intermediate member 428, and first and second valve assemblies 430 and 432. The first and second upper members 424 and 426 are threaded onto the base member 428 to form the housing assembly 422.

The first and second valve assemblies 430 and 432 are arranged below first and second regulator chambers 434 and 436, respectively, defined by the housing assembly 422. The exemplary valve assemblies 430 and 432 are similar in construction and each comprises a valve spring 440, a valve member 442, and a valve seat surface 444. The valve springs 440 bias the valve members 442 towards the valve seat surfaces 444 such that the valve assemblies 430 and 432 are normally closed.

The valve assemblies 430 and 432 open substantially linearly in response to first and second valve control forces applied to first and second regulator plates 450 and 452. The regulator plates 450 and 452 are suspended within the regulator chambers 434 and 436 between the valve springs 440 and first and second regulator springs 454 and 456. The regulator springs 454 and 456 bias the valve assemblies 430 and 432 into the open position against the force of the valve springs 440.

In use, fluid is introduced into an inlet port 460 and then flows through the system 420 along a main flow path to an outlet port 462 as follows. A small amount of fluid flows along a bypass path such that the combination of the fluid pressure along the bypass path and the biasing force applied by the regulator springs 454 and 456 creates control forces that control the valve assemblies 430 and 432 to maintain substantially a substantially constant fluid flow rate through the flow controller 20. Under proper conditions, the fluid flow rate through the flow controller 20 is substantially independent of upstream or downstream pressure changes.

In the exemplary system 420, the control forces applied to the valve assembly 432 are generated at least in part by a control system 470 a portion of which is mounted on the second upper member 426. In particular, the control system 470 comprises a motor assembly 472, an actuator member 474, and a housing 476. The housing 476 supports the motor assembly 472 above the second regulator chamber 436. A threaded portion of the actuator member 474 extends through a threaded actuator opening 478 in the second upper member 426. The actuator member 474 engages the second regulator plate 452 to apply a control force that opposes the force applied to the regulator plate 452 by the second regulator spring 456.

The actuator member 474 is operatively connected to the motor assembly 472 such that operation of the motor assembly 472 causes axial rotation of the actuator member 474. The actuator member 474 engages the threaded actuator opening 478 such that axial rotation of the member 474 is translated into axial displacement of the member 474 towards and away from the second regulator plate 452. Operation of the motor assembly 472 can thus increase or decrease the control force applied to the regulator plate 452.

As is apparent from the foregoing discussion of the flow controller system 220, increasing or decreasing the control force applied to the regulator plate 452 will vary the rate of fluid flow along the main flow path through the controller 420.

The motor assembly 472 is or may be a conventional stepper motor that is controlled by a USER SETPOINT INPUT signal to cause axial rotation of the actuator member 474. With the USER SETPOINT SIGNAL at a desired value, the system 420 will maintain constant fluid flow at a rate corresponding to that desired value. If the value of the USER SETPOINT SIGNAL changes to a second desired value, the fluid flow through the system 420 will change to a second flow rate corresponding to the second desired value.

Accordingly, a controller that generates the USER SETPOINT SIGNAL can change the desired flow rate as required at a given point in time. Once that desired flow rate is set, the system 420 will operate as described above with reference to the system 220 to maintain a constant flow rate even with changing upstream and downstream pressures.

The exemplary motor assembly 472 further comprises a rotary encoder that generates a ROTARY POSITION OUT signal that corresponds to the angular position of the actuator member 474. The ROTARY POSITION OUT provides feedback to the controller that generates the USER SETPOINT SIGNAL for more precise control of the motor assembly 472.

IV. Fourth Embodiment

Figure 8:
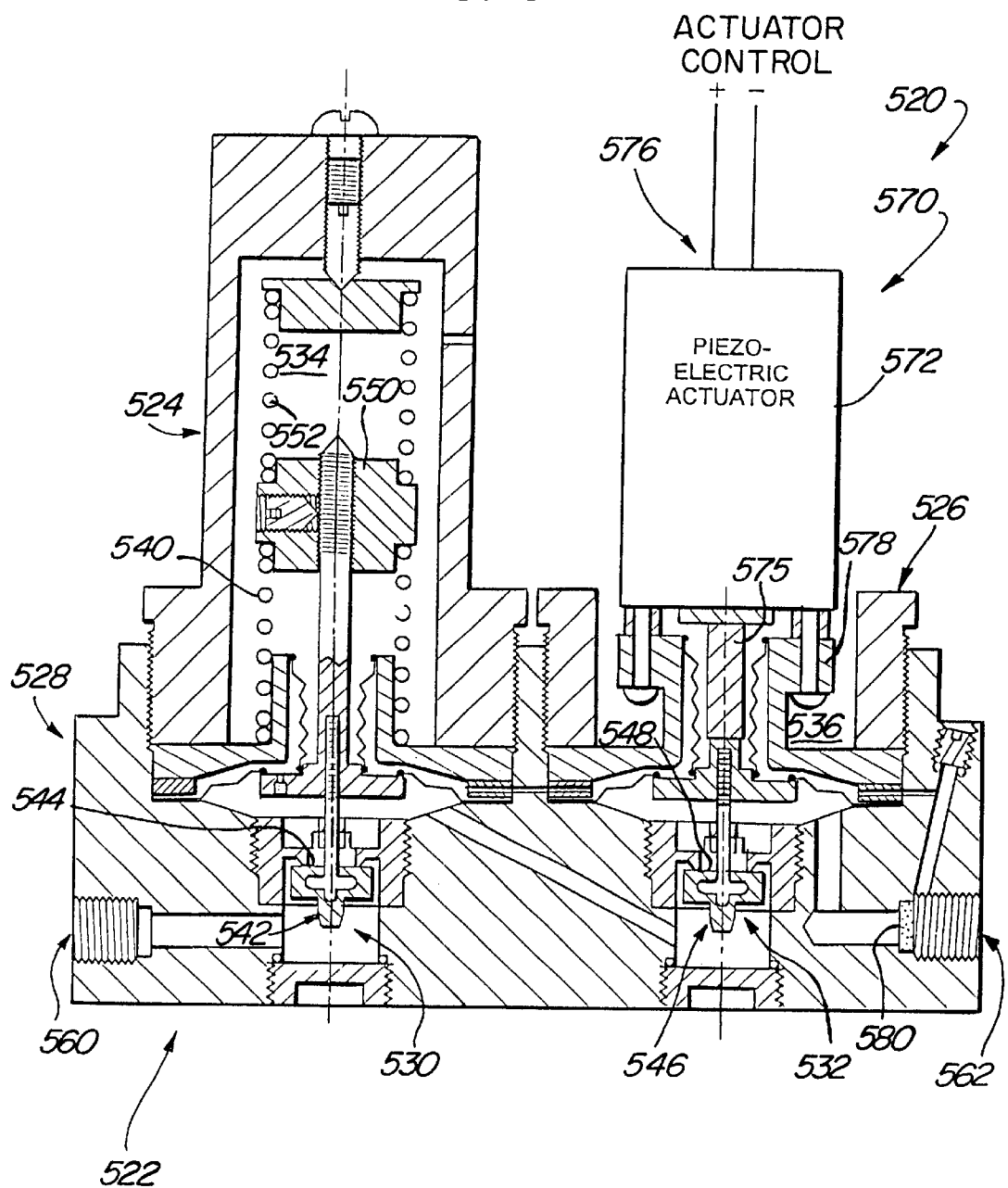
FIG. 8 is a section view of a fourth embodiment of a flow controller constructed in accordance with, and embodying, the principles of the present invention.

Referring now to FIG. 8, depicted at 520 therein is yet another exemplary flow controller system constructed in accordance with, and embodying, the principles of the present invention. The flow controller system 520 of the fourth embodiment is similar to the flow controller system 220 described above. In the interests of brevity and clarity, the flow controller system 520 will be described primarily to the extent that it differs from the flow controller system 220.

The flow controller system 520 is designed to be electrically controlled so that the system 520 may be operated remotely and/or as part of a larger system having a centralized controller.

The exemplary flow controller system 520 comprises a housing assembly 522 comprising a first upper member 524, a second upper member 526, a base or intermediate member 528, and first and second valve assemblies 530 and 532. The first and second upper members 524 and 526 are threaded onto the base member 528 to form the housing assembly 522.

The first and second valve assemblies 530 and 532 are arranged at least partly within a regulator chamber 534 and a regulator cavity 536, respectively, defined by the housing assembly 522. The exemplary valve assembly 530 comprises a valve spring 540, a valve member 542, and a valve seat surface 544. The valve spring 540 biases the valve member 542 towards the valve seat surface 544 such that the valve assembly 530 is normally closed. The exemplary valve assembly 532 comprises a valve member 546 and a valve seat surface 548. The valve assembly 532 is closed when the valve member 546 engages the valve seat surface 548.

The first valve assembly 530 opens substantially linearly in response to a first valve control force applied to a regulator plate 550. The regulator plate 550 is suspended within the regulator chamber 534 between the valve spring 540 and a regulator spring 552. The regulator spring 552 biases the valve assembly 530 into the open position against the force of the valve spring 540.

In use, fluid is introduced into an inlet port 560 and then flows s through the system 520 along a main flow path to an outlet port 562 as follows. A small amount of fluid flows along a bypass path to control the first valve assembly 530 by applying a first control force thereon. The pressure of the fluid flowing along the bypass path is further used to control second valve assembly 532. The valve assemblies 530 and 532 are controlled to maintain substantially a substantially constant fluid flow rate through the flow controller 520. Under proper conditions, the fluid flow rate through the flow controller 520 is substantially independent of upstream or downstream pressure changes.

Figure 9:
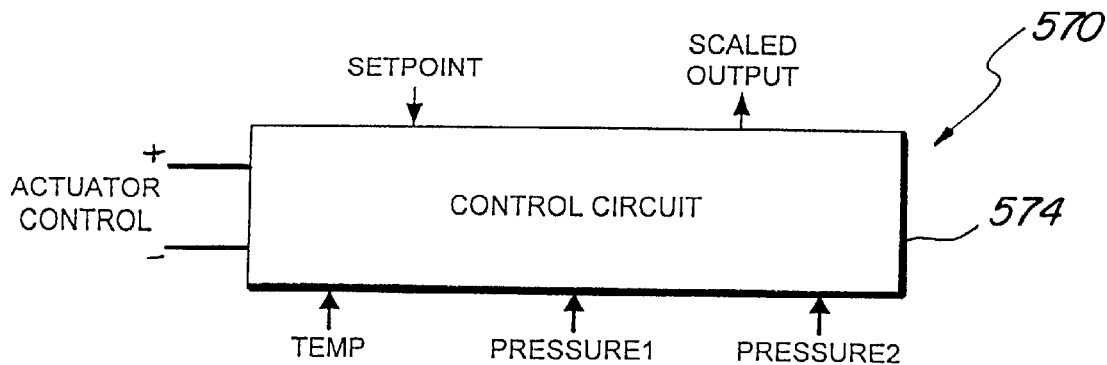
FIG. 9 is a block diagram view of a control system that may be used in connection with the flow controller of FIG. 8.

In particular, the exemplary system 520 further comprises a control system 570. The control system 570 comprises a piezo-electric actuator 572 (FIG. 8) and a control circuit 574 (FIG. 9). The piezo-electric actuator 572 is conventional and comprises a shaft 575 that moves along a shaft axis according to an ACTUATOR CONTROL signal applied to inputs 576 of the actuator 572. The shaft 575 is in turn operatively connected to the valve member 546 such that movement of the shaft 575 moves the valve member 546. The exemplary actuator 572 is bolted to a collar member 578 that forms a part of the housing assembly 522 and is held in place by the second upper member 526.

As shown in FIG. 9, the control circuit 574 generates the ACTUATOR CONTROL signal based on a SETPOINT signal and one or more pressure signals PRESSURE1 and PRESSURE2. The control circuit 574 also generates a SCALED OUTPUT signal that, when the system 520 is calibrated, corresponds to the flow rate of fluid through the system 520.

In the exemplary flow controller system 520, the actuator 572 and control circuit 574 form an electromechanical feedback system that replaces one of the mechanical feedback systems employed by the flow controller systems 20, 220, and 420 described above.

In particular, the pressure signals PRESSURE1 and PRESSURE2 correspond to the pressures upstream and downstream of a restriction member 580 employed by the system 520. The difference between the PRESSURE1 and PRESSURE2 signals is the differential pressure across the restriction member 580.

In the exemplary system 520, the PRESSURE1 and PRESSURE2 signals are preferably sampled at any one of a number of sampling locations. These sampling locations may be spaced along the bypass path, at the output port, or the like are possible. The sensors should be isolated from the main and bypass flow paths when the fluid is sensitive to contamination.

The control circuit 574 may comprise a microprocessor operating under control of a software program. In this case, appropriate digital-to-analog and analog-to-digital converters are used to translate between analog signals employed by components peripheral to the microprocessor and digital signals and commands that are processed within the microprocessor. The software program will be customized for a particular application, but will in general implement algorithms and logic necessary to generate the ACTUATOR CONTROL signal as described below.

Alternatively, the control circuit 574 may be a dedicated analog or hybrid digital/analog circuit that directly implements the algorithms and logic necessary to generate the ACTUATOR CONTROL signal. The decision of whether to use a software controlled microprocessor or a dedicated analog or hybrid circuit will depend upon such factors as the size, cost, and performance characteristics of the system 520.

In the exemplary system 520, the ACTUATOR CONTROL signal is an analog voltage that controls the piezo-electric actuator to move the valve member 546 as necessary to maintain fluid flow through the system 520 at rate determined by the SETPOINT signal.

In certain circumstances, the mechanical feedback systems employed by the flow controllers 20, 220, and 420 described above will continuously oscillate between closed and open valve positions to maintain constant fluid flow. In contrast, the control system 570 of the flow controller 520 will operate the valve assembly 532 such that the valve assembly 532 is closed, partly open, or fully open as necessary to maintain constant fluid flow. The ability of the valve assembly 532 to be held in a partly open position can allow the control system 570 to exist in a steady state without the oscillations that may be encountered with mechanical feedback systems.

In many environments, a continuously oscillating valve assembly is acceptable; in other environments, allowing the valve assembly to reach a steady state is preferred, and the system 520 may be the implementation of choice.

In some situations, the algorithm implemented by the control circuit 574 may operate independent of fluid temperature. In other situations, the fluid temperature may be monitored to improve the constancy of fluid flow through the system 520. In particular, the exemplary control circuit 574 generates the ACTUATOR CONTROL signal further based on a TEMP signal corresponding to the temperature of fluid flowing through system 520. The TEMP signal allows the control circuit algorithm to factor in the state of the fluid flowing through the system 520. The state of the fluid flowing through the system affects the mass flow and viscosity of the fluid. Knowledge of the state of the fluid may be important for calibration in some situations.

V. Fifth Embodiment

Figure 10:
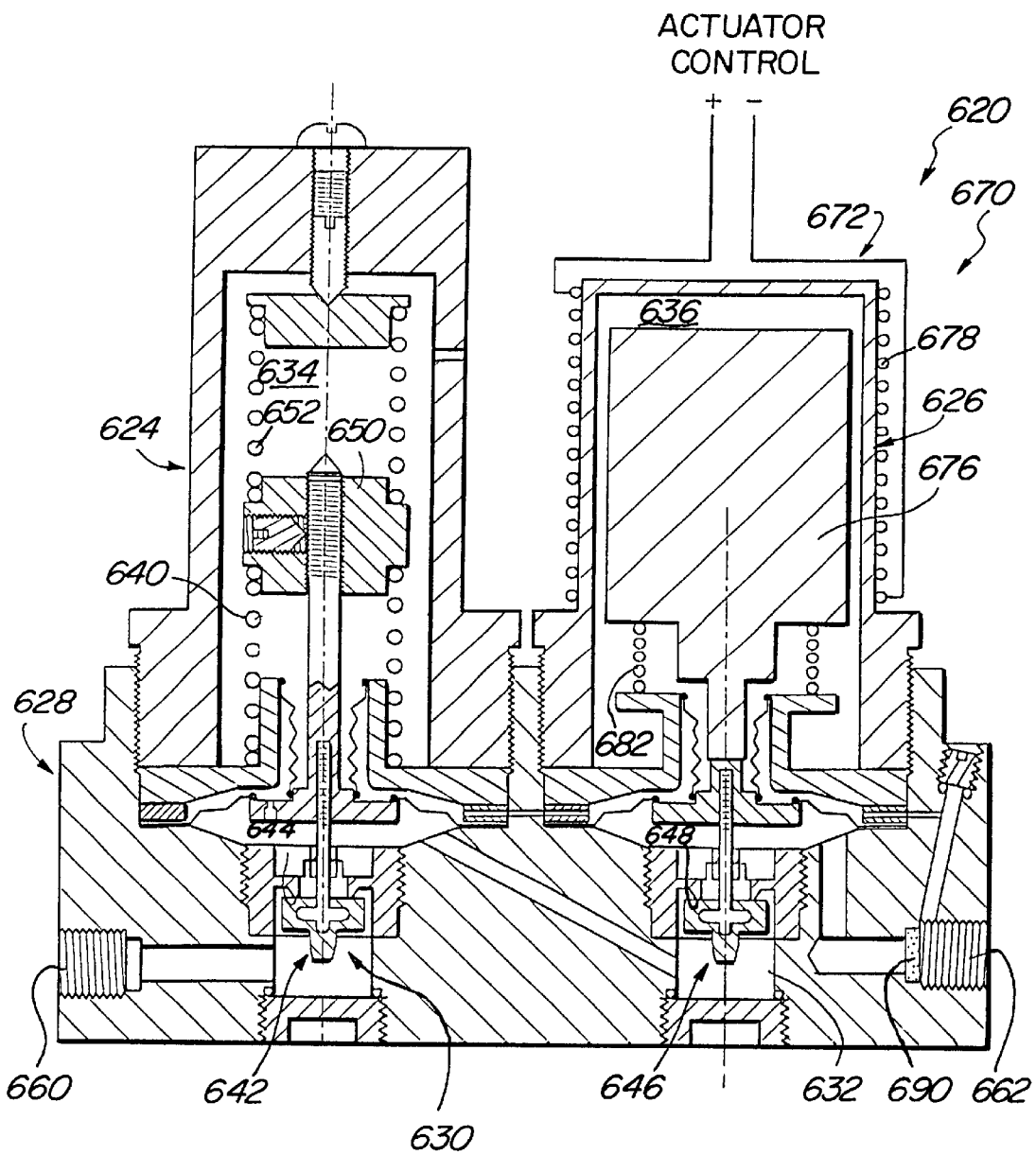
FIG. 10 is a section view of a fifth embodiment of a flow controller constructed in accordance with, and embodying, the principles of the present invention.

Referring now to FIG. 10, depicted at 620 therein is yet another exemplary flow controller system constructed in accordance with, and embodying, the principles of the present invention. The flow controller system 620 of the fifth embodiment is similar to the flow controller system 220 described above. In the interests of brevity and clarity, the flow controller system 620 will be described primarily to the extent that it differs from the flow controller system 220.

The flow controller system 620 is designed to be electrically controlled so that the system 620 may be operated remotely and/or as part of a larger system having a centralized controller.

The exemplary flow controller system 620 comprises a housing assembly 622 comprising a first upper member 624, a second upper member 626, a base or intermediate member 628, and first and second valve assemblies 630 and 632. The first and second upper members 624 and 626 are threaded onto the base member 628 to form the housing assembly 622.

The first and second valve assemblies 630 and 632 are arranged below first and second regulator chambers 634 and 636, respectively, defined by the housing assembly 622. The exemplary valve assembly 630 comprises a valve spring 640, a valve member 642, and a valve seat surface 644. The valve spring 640 biases the valve member 642 towards the valve seat surface 644 such that the valve assembly 630 is normally closed. The exemplary valve assembly 632 comprises a valve member 646 and a valve seat surface 648. The valve assembly 632 is closed when the valve member 646 engages the valve seat surface 648.

The first valve assembly 630 opens substantially linearly in response to a first valve control force applied to a regulator plate 650. The regulator plate 650 is suspended within the regulator chamber 634 between the valve spring 640 and a regulator spring 652. The regulator spring 652 biases the valve assembly 630 into the open position against the force of the valve spring 640.

In use, fluid is introduced into an inlet port 660 and then flows through the system 620 along a main flow path to an outlet port 662 as follows. A small amount of fluid flows along a bypass path to control the first valve assembly 630 by applying a first control force thereon. The pressure of the fluid flowing along the bypass path may further be used to control the second valve assembly 632. The valve assemblies 630 and 632 are controlled to maintain substantially a substantially constant fluid flow rate through the flow controller 620. Under proper conditions, the fluid. flow rate through the flow controller 620 is substantially independent of upstream or downstream pressure changes.

Figure 11:
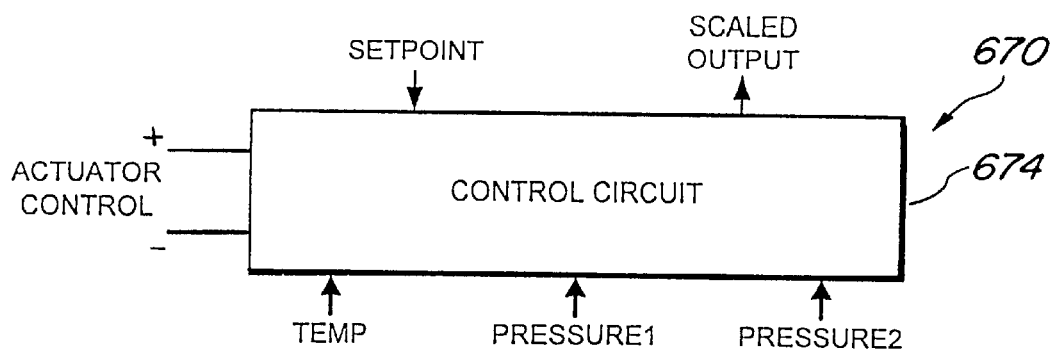
FIG. 11 is a block diagram view of a control system that may be used in connection with the flow controller of FIG. 10.

In particular, the exemplary system 620 further comprises a control system 670. The control system 670 comprises a solenoid actuator 672 (FIG. 10) and a control circuit 674 (FIG. 11). The solenoid actuator 672 is conventional and comprises a winding 676 and a solenoid member 678 that moves along a solenoid axis according to an ACTUATOR CONTROL signal applied to inputs 680 of the actuator 672. The solenoid member 678 is supported within the second regulator chamber 636 by a solenoid spring 682. The solenoid member 678 is in turn operatively connected to the valve member 646 such that movement of the solenoid member 678 moves the valve member 646.

As shown in FIG. 11, the control circuit 674 generates the ACTUATOR CONTROL signal based on a SETPOINT signal and one or more pressure signals PRESSURE1 and PRESSURE2. The control circuit 674 also generates a SCALED OUTPUT signal that, when the system 620 is calibrated, corresponds to the flow rate of fluid through the system 620.

In the exemplary system 620, the PRESSURE1 and PRESSURE2 signals are preferably sampled at sampling locations along the bypass path to prevent the main fluid flow from coming into contact with the pressure sensors that generate the signals PRESSURE1 and PRESSURE2. Again, other sampling locations, such as directly at the output port 662, are possible with fluids less sensitive to contamination.

In the exemplary flow controller system 620, the actuator 672 and control circuit 674 form an electromechanical feedback system that replaces one of the mechanical feedback systems employed by the flow controller systems 20, 220, and 420 described above.

In particular, the pressure signals PRESSURE1 and PRESSURE2 correspond to the pressures upstream and downstream of a restriction member 690 employed by the system 620. The differential pressure across the restriction member 690 is used to control the valve assemblies 630 and 632. These pressures may be measured at sampling locations spaced along the bypass path, at the output port, or the like. The sensors should be isolated from the main and bypass flow paths when the fluid is sensitive to contamination.

The control circuit 674 may comprise a microprocessor operating under control of a software program or a dedicated analog or hybrid digital/analog circuit. The software program or hybrid circuit implements algorithms and logic necessary to generate the ACTUATOR CONTROL signal.

In the exemplary system 620, the ACTUATOR CONTROL signal is an analog current that passes through the windings 676 and induces movement of the solenoid member 678 and thus the valve member 646 as necessary to maintain fluid flow through the system 620 at rate determined by the SETPOINT signal.

Like the control system 570 of the flow controller system 520 described above, the control system 670 of the flow controller 620 will operate the valve assembly 632 in closed, partly open, or fully open positions as necessary to maintain constant fluid flow. The ability of the valve assembly 632 to be held in a partly open position can allow the control system 670 to exist in a steady state without the oscillations that may be encountered with mechanical feedback systems. In certain environments, allowing the valve assembly to reach a steady state is preferred, and the system 620 may be the implementation of choice.

In some situations, the algorithm implemented by the control circuit 674 may operate independent of fluid temperature. The fluid temperature is monitored in the exemplary system 620 to improve the constancy of fluid flow. In particular, the exemplary control circuit 674 generates the ACTUATOR CONTROL signal further based on a TEMP signal corresponding to the temperature of fluid flowing through system 620. The TEMP signal thus allows the control circuit algorithm to factor in the state of the fluid flowing through the system 620.

VI. Sixth Embodiment

Referring now to FIG. 12, depicted at 720 therein is yet another exemplary flow controller system constructed in accordance with, and embodying, the principles of the present invention. The flow controller system 720 of the sixth embodiment is similar to the flow controller system 220 described above. In the interests of brevity and clarity, the flow controller system 720 will be described primarily to the extent that it differs from the flow controller system 220.

The flow controller system 720 is designed to be electrically controlled so that the system 720 may be operated remotely and/or as part of a larger system having a centralized controller.

The exemplary flow controller system 720 comprises a housing assembly 722 comprising a first upper member 724, a second upper member 726, a base or intermediate member 728, and first and second valve assemblies 730 and 732. The first and second upper members 724 and 726 are threaded onto the base member 728 to form the housing assembly 722.

The first and second valve assemblies 730 and 732 are arranged below first and second regulator chambers 734 and 736, respectively, defined by the housing assembly 722. The exemplary valve assembly 730 comprises a valve member 740 and a valve seat surface 742. The exemplary valve assembly 732 similarly comprises a valve member 744 and a valve seat surface 746. The valve assemblies 730 and 732 are closed when the valve members 740 and 744 engage the valve seat surfaces 742 and 746, respectively.

In use, fluid is introduced into an inlet port 760 and then flows through the system 720 along a main flow path to an outlet port 762 as follows. A small amount of fluid flows along a bypass path. The pressure of the fluid flowing along the bypass path is used to control the first and second valve assemblies 730 and 732 to maintain substantially a substantially constant fluid flow rate through the flow controller 720. Under proper conditions, the fluid flow rate through the flow controller 720 is substantially independent of upstream or downstream pressure changes.

Figure 13:
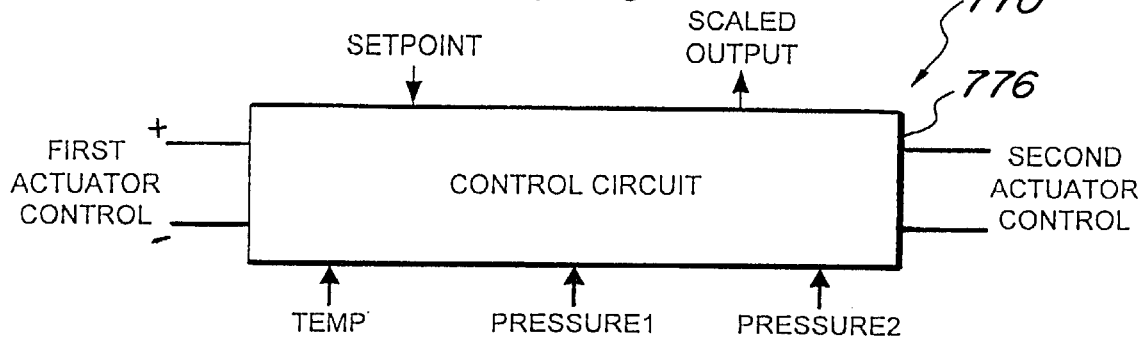
FIG. 13 is a block diagram view of a control system that may be used in connection with the flow controller of FIG. 12.

In particular, the exemplary system 720 further comprises a control system 770. The control system 770 comprises first and second solenoid actuators 772 and 774 (FIG. 12) and a control circuit 776 (FIG. 13). The solenoid actuators 772 and 774 are conventional and each comprise a winding 776 and a solenoid member 778 that moves along axes defined by the actuators 772 and 774. A FIRST ACTUATOR CONTROL signal and a SECOND ACTUATOR CONTROL signal are applied to inputs 780 of the actuators 772 and 774 to control movement of the solenoid members 778. The solenoid members 778 are supported within the first and second regulator chambers 734 and 736 by solenoid springs 782. The solenoid members 778 are in turn operatively connected to and move the first and second valve members 740 and 744.

As shown in FIG. 13, the control circuit 776 generates the ACTUATOR CONTROL signals based on a SETPOINT signal and one or more pressure signals PRESSURE1 and PRESSURE2. The control circuit 776 also generates a SCALED OUTPUT signal that, when the system 720 is calibrated, corresponds to the flow rate of fluid through the system 720.

In the exemplary system 720, the PRESSURE1 and PRESSURE2 signals are generated by pressure sensors arranged at appropriate sampling locations. The sensors should be isolated from the main and bypass flow paths when the fluid is sensitive to contamination. Again, other sampling locations, such as directly at the output port, are possible with fluids less sensitive to contamination.

In the exemplary flow controller system 720, the actuators 772 and 774 and control circuit 776 form electromechanical feedback systems that replace the mechanical feedback systems employed by the flow controller systems 20, 220, and 420 described above.

In particular, the pressure signals PRESSURE1 and PRESSURE2 correspond to the pressures upstream and downstream of a restriction member 790 employed by the system 720. The difference between the PRESSURE1 and PRESSURE2 signals represents the differential pressure across the restriction member 790 and is used to control the valve assemblies 730 and 732.

The control circuit 776 may comprise a microprocessor operating under control of a software program or a dedicated analog or hybrid digital/analog circuit. The software program or hybrid circuit implement algorithms and logic necessary to generate the ACTUATOR CONTROL signals as described below.

In the exemplary system 720, the ACTUATOR CONTROL signals are analog currents that pass through the windings 776 and induce movement of the solenoid members 778 and thus the valve members 740 and 744 as necessary to maintain fluid flow through the system 720 at a rate determined by the SETPOINT signal.

Like the control systems 570 and 670 of the flow controller systems 520 and 620 described above, the control system 770 operates the valve assemblies 730 and 732 in closed, partly open, or fully open positions as necessary to maintain constant fluid flow. The ability of the valve assemblies 730 and 732 to be held in a partly open position can allow the control system 770 to exist in a steady state without the oscillations that may be encountered with mechanical feedback systems. Allowing both valve assemblies to reach a steady state may be preferred, in which case the system 720 may be the implementation of choice.

In the exemplary system 720, the exemplary control circuit 776 generates the ACTUATOR CONTROL signals further based on a TEMP signal corresponding to the temperature of fluid flowing through system 720. The use of the TEMP signal is, however, not essential to any implementation of the present invention.

VII. Additional Considerations

In the foregoing embodiments, certain of the components have been described as they are used in the examples given. The properties of many of these components can be changed depending upon the circumstances to "tune" the flow controllers for a particular use.

For example, the various springs used, interior chambers defined by the valve stems, and inlet and outlet openings in the valve stems must be selected based on the type of fluid, expected inlet pressures, and desired flow rates.

In addition, the materials used for the various components must be selected based on the pressures and types of fluids expected. For example, for air at low pressures, plastic may be used for many of the components. For caustic fluids and higher pressures, steel or stainless steel may be used.

In systems using one or more electromechanical feedback systems, the algorithm implemented by the control circuit, whether using discrete components or software, will also be created for a given set of predetermined parameters.

In the interests of brevity, the Applicant has described only six exemplary flow controller systems that may be constructed in accordance with the principles of the present invention. One of ordinary skill in the art will, however, recognize that certain features of these systems may be arranged in combinations that yield still more implementations of flow controllers constructed in accordance with the principles of the present invention.

In particular, the first and second exemplary flow controller systems 20 and 220 may be characterized as canister and plate configurations, respectively, because of overall appearance of the housing assemblies thereof: the housing assembly 22 comprises a generally cylindrical base or intermediate member 28, while the housing assembly 222 comprises a generally planar base or intermediate member 228.

The third through sixth embodiments 320, 420, 520, 620, and 720, disclose the use of one or more electromechanical feedback systems in the context of a plate configuration. However, such electromechanical feedback systems may be used in the context of a canister configuration, as well. In addition, the electromechanical feedback systems may be used in combination with each other and/or other types of feedback systems as desirable for a given environment.

A designer may design a particular implementation by initially determining the operating environment in which the flow controller system is to be used. The operating environment will include the properties fluid itself, the expected range of fluid input and output pressures, the ambient conditions, the tolerance for error, and the like. The designer may also consider commercial factors such as cost.

Based on the operating and commercial environments, the designer will initially decide on the basic physical structure of the flow controller housing by selecting from among a plurality of basic structure types such as canister, plate, or the like.

The designer will also select the material from which the housing assembly and other components are made based on the operating and commercial environments; if the fluid is a corrosive liquid or gas, the housing assembly may be made of stainless steel or other material that resists corrosion. The selected material may be plastic if the commercial environment dictates that the flow controller system is to be disposable.

The designer will then decide on the type of feedback regulator system that may be used in the input and output regulators. Generally, the designer may elect to use a mechanical or electrical feedback system for either or both regulators. If an electrical feedback system is used, the designer may elect to use a rotational device such as a stepper motor or a translating device such as a piezo-electric actuator or a solenoid actuator.

When the operating and commercial environments and physical structure of the flow controller system are determined, the algorithm necessary to implement the physical structure in the particular environment is determined. In a mechanical feedback system, this step will include selecting the type and arrangement of springs and other control devices employed. In an electrical feedback system, this step will include the design of an appropriate feedback loop to obtain the desired operational characteristics.

Accordingly, the invention may be embodied in forms other than those described herein without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

We claim:

1. A flow controller comprising:
   a housing assembly defining an inlet port, an outlet port, and a main flow path extending between the inlet port and the outlet port;
   a restriction member arranged in the main flow path;
   a first valve assembly arranged to allow or prevent fluid flow along the main flow path;
   a second valve assembly arranged to allow or prevent fluid flow along the main flow path;
   a first regulator assembly arranged to operate the first valve assembly based on a differential pressure across the restriction member; and
   a second regulator assembly arranged to operate the second valve assembly based on the differential pressure across the restriction member.

2. A flow controller as recited in claim 1, in which the housing assembly further defines a bypass path, where the differential pressure across the restriction member is detected at least in part based on a pressure within the bypass path.

3. A flow controller as recited in claim 1, in which the first regulator assembly comprises a first valve assembly and a first feedback system arranged to open and close the first valve assembly to maintain constant fluid flow out of the outlet port.

4. A flow controller as recited in claim 1, in which the second regulator assembly comprises a second valve assembly and a second feedback system arranged to open and close the second valve assembly to maintain constant fluid flow out of the outlet port.

5. A flow controller as recited in claim 3, in which the second regulator assembly comprises a second valve assembly and a second feedback system arranged to open and close the second valve assembly to maintain constant fluid flow out of the outlet port.

6. A flow controller as recited in claim 3, in which the first feedback system comprises a mechanical feedback system that directly senses the differential pressure across the restriction member.

7. A flow controller as recited in claim 4, in which the second feedback system comprises a mechanical feedback system that directly senses the differential pressure across the restriction member.

8. A flow controller as recited in claim 5, in which:
   the first feedback system comprises a first mechanical feedback system that directly senses the differential pressure across the restriction member; and
   the second feedback system comprises a second mechanical feedback system that directly senses the differential pressure across the restriction member.

9. A flow controller as recited in claim 3, in which the first feedback system comprises an electrical feedback system that indirectly senses the differential pressure across the restriction member.

10. A flow controller as recited in claim 4, in which the second feedback system comprises an electrical feedback system that indirectly senses the differential pressure across the restriction member.

11. A flow controller as recited in claim 5, in which:
    the first feedback system comprises a first electrical feedback system that indirectly senses the differential pressure across the restriction member; and
    the second feedback system comprises a second electrical feedback system that indirectly senses the differential pressure across the restriction member.

12. A flow controller as recited in claim 5, in which:
    the first feedback system comprises a mechanical feedback system that directly senses the differential pressure across the restriction member; and
    the second feedback system comprises an electrical feedback system that indirectly senses the differential pressure across the restriction member.

13. A flow controller as recited in claim 5, in which:
    the first feedback system comprises an electrical feedback system that indirectly senses the differential pressure across the restriction member; and
    the second feedback system comprises a mechanical feedback system that directly senses the differential pressure across the restriction member.

14. A flow controller as recited in claim 9, in which the electrical feedback system comprises:
    an actuator assembly for opening and closing the first valve assembly in response to a control signal; and a control circuit for generating the control signal in response to at least one signal indicative of the differential pressure across the restriction member.

15. A flow controller as recited in claim 10, in which the electrical feedback system comprises:

an actuator assembly for opening and closing the second valve assembly in response to a control signal; and a control circuit for generating the control signal in response to at least one signal indicative of the differential pressure across the restriction member.

16. A flow controller as recited in claim 11, in which:

the first electrical feedback system comprises a first actuator assembly for opening and closing the first valve assembly in response to a first control signal; and a first control circuit for generating the first control signal in response to at least one signal indicative of the differential pressure across the restriction member; and the second electrical feedback system comprises a second actuator assembly for opening and closing the second valve assembly in response to a second control signal; and a second control circuit for generating the second control signal in response to at least one signal indicative of the differential pressure across the restriction member.

17. A flow controller as recited in claim 2, in which:

the first regulator assembly comprises a first diaphragm assembly, where the housing assembly and the first diaphragm assembly define an input chamber, a first bypass chamber, and a first regulator chamber;

the second regulator assembly comprises a second diaphragm assembly, where the housing assembly and the second diaphragm assembly define an outlet chamber, a second bypass chamber, and a second regulator chamber;

the first diaphragm assembly defines a first bypass passageway that allows fluid flow between the inlet chamber and the first bypass chamber, where a bypass member is located within the first bypass passageway to create a pressure differential between the inlet chamber and the first bypass chamber;

the housing assembly defines a second bypass passageway that allows fluid to flow between the first bypass chamber and the second bypass chamber, and a sampling passageway that allows fluid to flow from the outlet chamber to the second bypass chamber;

where the bypass path extends through the first bypass passageway, the first bypass chamber, the second bypass passageway, the second bypass chamber, and the sampling passageway.

18. A flow controller as recited in claim 17, in which:

the first regulator assembly comprises a first control system at least a portion of which is located within the first regulator chamber, where the first diaphragm assembly isolates the first control system from fluid flowing along the main and bypass paths; and the second regulator assembly comprises a second control system at least a portion of which is located within the second regulator chamber, where the second diaphragm assembly isolates the second control system from fluid flowing along the main and bypass paths.

19. A flow controller as recited in claim 1, in which:

the first valve assembly comprises a first valve seat member detachably attached to the housing assembly; and the second valve assembly comprises a second valve seat member detachably attached to the housing assembly.

20. A flow controller as recited in claim 19, in which the housing assembly comprises an intermediate member, a first end member, and a second end member, where the first end member is detachably attached to the intermediate member to allow access to the first valve seat member and the second end member is detachably attached to the intermediate member to allow access to the second valve seat member.

* * * * *